(12) United States Patent
Kamimura

(10) Patent No.: US 8,271,867 B2
(45) Date of Patent: Sep. 18, 2012

(54) PROGRAM FOR DISPLAYING AND OPERATING TABLE

(76) Inventor: Kunio Kamimura, Tokyo (JP)

( * ) Notice: Subject to any disclaimer, the term of this patent is extended or adjusted under 35 U.S.C. 154(b) by 0 days.

(21) Appl. No.: 12/996,382

(22) PCT Filed: Jun. 18, 2008

(86) PCT No.: PCT/JP2008/001566
§ 371 (c)(1),
(2), (4) Date: Dec. 3, 2010

(87) PCT Pub. No.: WO2009/153831
PCT Pub. Date: Dec. 23, 2009

(65) Prior Publication Data
US 2011/0093770 A1    Apr. 21, 2011

(51) Int. Cl.
*G06F 17/00* (2006.01)
*G06F 7/00* (2006.01)
(52) U.S. Cl. ........................................ 715/227; 707/626
(58) Field of Classification Search ................... 715/227; 707/626, 627
See application file for complete search history.

(56) References Cited

U.S. PATENT DOCUMENTS

| | | | | |
|---|---|---|---|---|
| 4,809,158 A | * | 2/1989 | McCauley | 1/1 |
| 5,604,854 A | * | 2/1997 | Glassey | 715/209 |
| 5,619,688 A | * | 4/1997 | Bosworth et al. | 1/1 |
| 5,826,257 A | * | 10/1998 | Snelling, Jr. | 1/1 |
| 5,870,747 A | * | 2/1999 | Sundaresan | 1/1 |
| 5,987,472 A | * | 11/1999 | Serafin | 1/1 |
| 6,481,011 B1 | * | 11/2002 | Lemmons | 725/47 |
| 6,626,959 B1 | * | 9/2003 | Moise et al. | 715/210 |
| 7,155,665 B1 | * | 12/2006 | Browne et al. | 715/243 |
| 7,412,645 B2 | * | 8/2008 | Kotler et al. | 715/212 |
| 7,526,719 B1 | * | 4/2009 | Gopalakrishnan | 715/227 |
| 7,685,510 B2 | * | 3/2010 | Sauermann | 715/227 |
| 2009/0276692 A1 | * | 11/2009 | Rosner | 715/227 |
| 2010/0138734 A1 | * | 6/2010 | Braud et al. | 715/227 |
| 2010/0174975 A1 | * | 7/2010 | Mansfield et al. | 715/227 |
| 2011/0106791 A1 | * | 5/2011 | Maim | 707/722 |
| 2011/0191343 A1 | * | 8/2011 | Heaton et al. | 707/737 |

FOREIGN PATENT DOCUMENTS

| JP | H02-81270 | 3/1990 |
|---|---|---|
| JP | H05-342071 | 12/1993 |

* cited by examiner

*Primary Examiner* — Laurie Ries

(57) ABSTRACT

In columns of a table, a list of labels of records of a table referenced by the table as a relation is displayed. A correlational display function of the record of interest enables information on a table involving an operator to be grasped in one table. When a record of the table of the reference origin is selected, a record referenced by the selected record is highlighted. Conversely, when a record of the reference destination is selected, the record of the reference origin referencing the selected record is highlighted and the related record is displayed in the same line or in the neighborhood. The reference, addition or change of a record of the reference destination can be intuitively performed around the table of the reference origin. A new record can be added to the reference destination during the addition of a record to the table of the reference origin. Information on the table of the reference destination is allowed to be grasped and managed with only an operation focusing on one table.

10 Claims, 11 Drawing Sheets

FIG.3

Table-A 0301

| Major key | ... | Item X-1 | Item X (table-B) | Item X+1 |
|---|---|---|---|---|
|  |  |  | (Dummy) |  |
|  |  |  | (Dummy) |  |
|  |  |  | 1 B |  |
| Record "a" |  |  | 2 B |  |
|  |  |  | 3 B |  |
|  |  |  | (Dummy) |  |
|  |  |  | (Dummy) |  |

0302 — Item X-1
0303 — Item X (table-B)
0304 — Item X+1
0305 — Record "a"

Table-A 0306

| Major key | ... | Item X-1 | Item X | Item X+1 |
|---|---|---|---|---|
|  |  |  | 1 B |  |
|  |  |  | 1 B |  |
|  |  |  | 3 B |  |
| Record "a" |  |  | 2 B |  |
|  |  |  | 1 B |  |
|  |  |  | 3 B |  |
|  |  |  | 2 B |  |

| Item X (table-B) |
|---|
| (Dummy) |
| (Dummy) |
| 1 B |
| 2 B |
| 3 B |
| (Dummy) |
| (Dummy) |

0307 — Item X-1
0308 — Item X
0309 — Item X (table-B)
0310 — Item X+1
0311 — Record "a"

FIG.4

| Table-A | | |
|---|---|---|
| 0401 | 0402 | 0403 |
| ... | Item X | Item X (table-B) |
| | 2 B | (Dummy) |
| | 1 B | (Dummy) |
| | 1 B | 1 B |
| | 1 B | 2 B |
| | 2 B | 3 B |
| | 2 B | (Dummy) |
| | 3 B | (Dummy) |

0405, 0404 (Selection), 0406, 0407

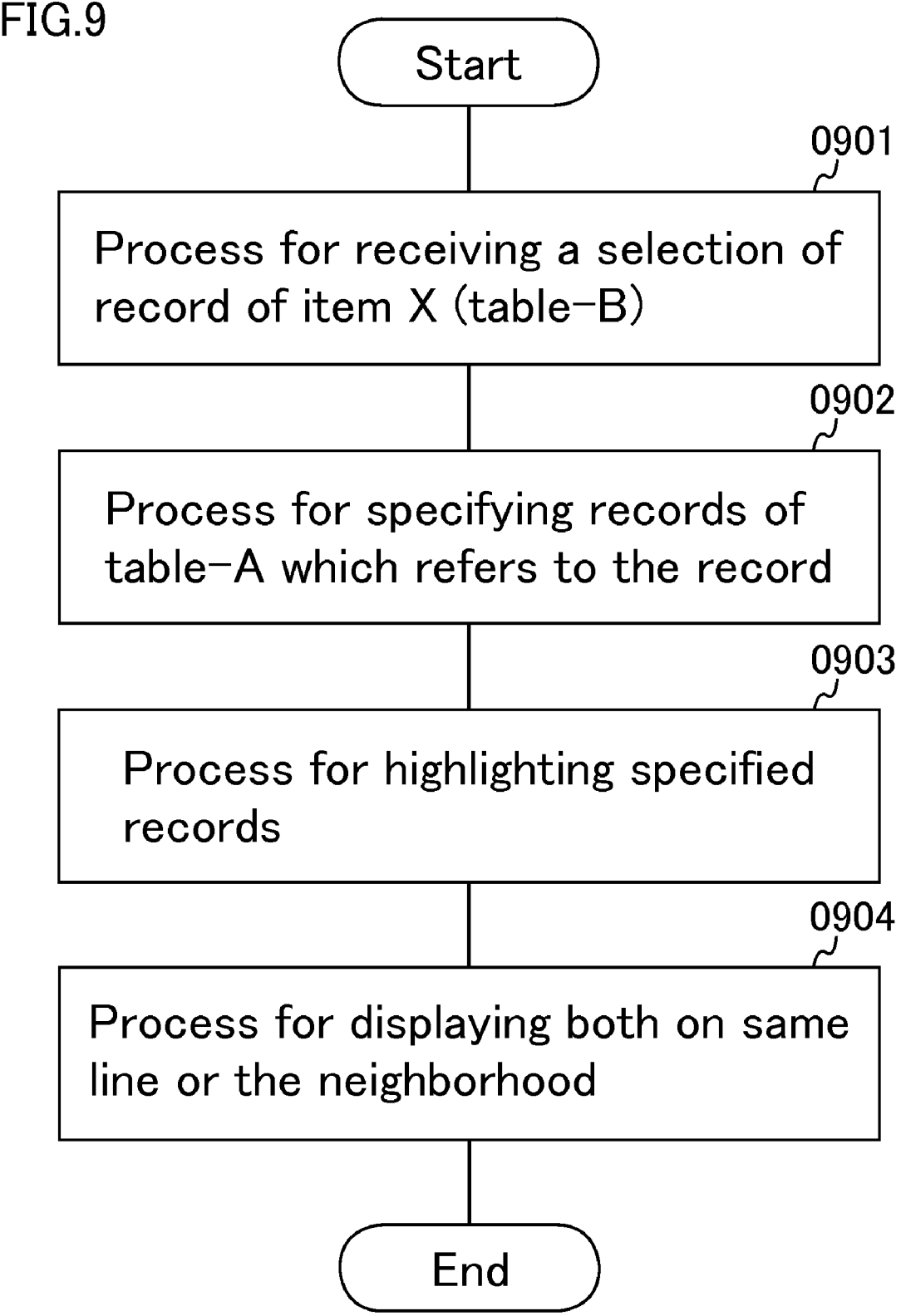

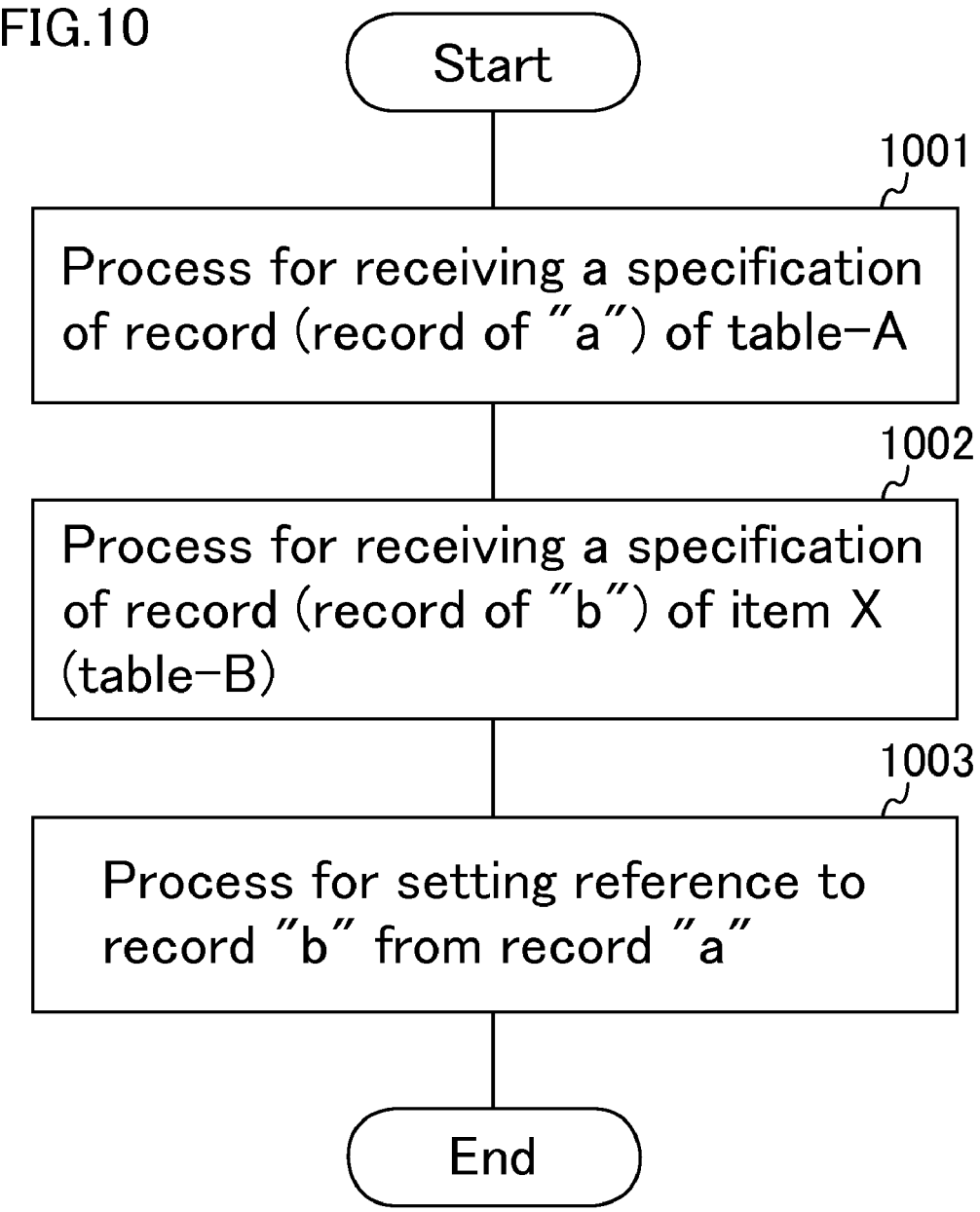

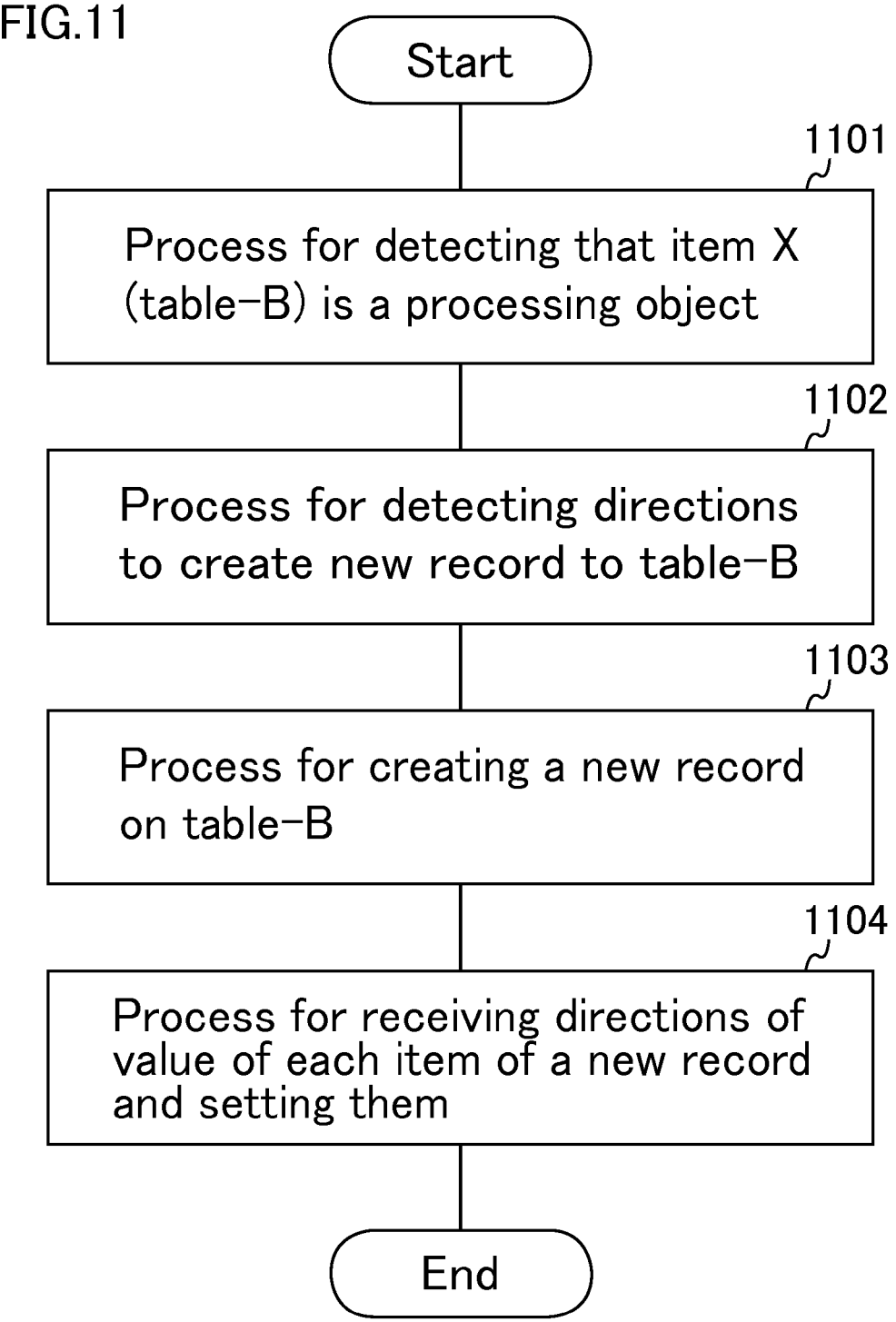

ered are the following. Not only records (of table-B)
PROGRAM FOR DISPLAYING AND OPERATING TABLE

TECHNICAL FIELD

The present invention is a program to show contents of a table in which relations were set and to handle this table by instructions of another program or an operator

BACKGROUND ART

A computer displays contents of a table of a database on a screen by table format (tabular format), and edits them by an operator's directions and prints them. When value of item X (0103) of each record of table-A (0101) is limited to a reference to records of specific table-B (0102), as shown in FIG. 1, we say "relation from item X (0103) to table-B (0102) has been set up". Value of item X (0103) of a record held in table-A (0101) shows major key of a record of table-B (0102). This is called reference 0104.

About relational data base, we sometimes say the following: Table as source of reference, that is table-A (0101) of FIG. 1, is called "subordinate table". Table as destination of reference, that is table-B (0102) of FIG. 1, is called "main table". However, this specification uses the following expressions: "table as source of reference" or "table-A", and "table as destination of reference" or "table-B".

FIG. 1 shows a major key and a label as a value of item X. For example, "3B:3" indicates "major key 3 of table-B (0102)", and its label "3B". This is for helping understanding. Usually, recorded is major key of the reference destination. Only labels are shown in FIG. 2 and the subsequent (of this specification). This is for helping understanding by human.

It is obvious to display a table by a tabular format. As shown in FIG. 2, if all the records of table-A (0201) are referring to a specific record of table-B (0202), for example "Tokyo", "Tokyo"s are shown in a line of item X (0203) in the tabular format of table-A (0201).

Inconvenience is the following. Any records (unless it is referred to) other than "Tokyo" of table-B (0202) are not expressed in table-A 0201. When seeing table-A (0201), the list of selectable values cannot be seen at item X (0203) of table-A (0201). They can be seen after table-B (0202) is opened.

Suppose that the following is found, at the middle of inputting a new record into table-A (0201). "Sapporo" which should be set up as a value of item X (0203) of the record, has not been registered to table-B. At this situation, we should do the followings. The input of this record to table-A (0203) is once stopped. Next, record of "Sapporo" is added to table-B (0202). The input to table-A (0201) is resumed. This kind of "redo of operations" is inconvenient.

Patents were investigated. Patent documents 1 embeds and displays a graph into a cell of a table. Patent documents 2 unify two or more tables to one table by alternation of records. By patent documents 3, value of a record of reference destination will be displayed when cursor stopped at an item to which the relation was set. All differ from the present invention.

Patent documents 4 show the structure for the following. "Performed is a sorting of a item, and highlighted are lines corresponding to the filter condition specified to the item". Patent document 5 shows how to express three-dimensional data with two or more two-dimensional spreadsheets. Patent documents 6 expresses in a graph the interrelation of the lump of the data expressed with spreadsheets or word processors. All differ from the present invention.

[Patent documents 1] JP, 2000-285179, A
[Patent documents 2] JP, 10-40314, A
[Patent documents 3] JP, 2000-35998, A
[Patent documents 4] U.S. Pat. No. 7,370,047 "System and method for filtering and sorting data", Gorman May 6, 2008
[Patent documents 5] U.S. Pat. No. 6,282,551, "System and methods for improved spreadsheet interface with user-familiar objects", Anderson et al, Aug. 28, 2001
[Patent documents 6] PCT/US2000/006640 "METHOD, AND APPARATUS FOR ORGANIZING AND PROCESSING INFORMATION USING A DIGITAL COMPUTER", HUGH Harlan M, Mar. 14, 2000

DESCRIPTION OF THE INVENTION

Problems to be Solved by the Invention

Expected are the following. Not only records (of table-B) referred from table-A, but also records (of table-B) not referred are perused along with records of table-A. Further, even at the middle of inputting a value of item of record into table-A, a new record can be input into table-B. That is, during the operation about table-A, information of the related table-B can be grasped and managed. Thus, an operator handles data, grasping whole perspective.

Means for Solving the Problem

"Basics": The present invention displays table-B on a part of table-A. It is explained concretely as the following. In the position of column of item X of table-A (0301), displayed is a list of the labels of records of table-B of the reference destination. This is "Item X (table-B)" (0303), which is located between "Item X–1" (0302) and "item X+1" (0304).

As a developed type, item X (0308) of table-A (0306) is still displayed, and simultaneously, labels of records of table-B of a reference destination may be displayed near item X (0308). More practically, items of table-A (0306) are lined as "item X–1" (0307) and "item X" (0308). Next, "item X (table-B)" (0309) is inserted. And "item X+1" (0310) follows.

In table-A (0306) of the lower part of FIG. 3, "item X (table-B)" (0309) may be placed before "item X+1" (0310), or at top or tail or any position of table-A (0306). It depends on operator's choice. In table-A (0301) of the upper part of FIG. 3, "item X (table-B)" (0303) may be placed at top or tail or any position.

Devices are further added to the above-mentioned "basics".

"Emphasis of differences": Records of table-B are shown as an item of table-A. Thus, when a record of table-A is seen horizontally, "item X (table-B)" does not necessarily indicates right value of the record. In order to show an operator this situation clearly, in table-A, "item X (table-B)" will be shown in different appearance from other items of table-A.

For example, differences can be emphasized by the following. "A background color of column of item X (table-B) is different from a background color of table-A". "A font of column of item X (table-B) is different from table-A". "Column of item X (table-B) is shown as if floating from table-A". "Lines of frame of "item X (table-B)" are made thick". And others.

"Display of references, (No. 1)": In order to display correspondence with records of table-A (0301, 0306) and records (of table-B) shown in "item-X (table-B)" (0303, 0309), the following mechanisms are introduced.

When record "a" (0305, 0311) of table-A is selected (that is left-clicked), the corresponding label (that is specified to the record of "a"), which is "2B" in this case, among labels (records) of "item X (table-B)" (0303, 0309), will be selected and placed to same row (position) of record "a" (0305, 0311). The selective state is expressed, by dotted lines (dotted lines of right and left of "2B") of record "a" of FIG. 3.

When there is little number of records of table-B, "2B", the corresponding label of "item X (table-B)" (0303, 0309), can be moved to same row of record of "a", by adding dummy labels to "item X (table-B)" (0303, 0309) by the program.

On the contrary, when there is much number of records of table-B, "item X (table X)" (0303, 0309) will have vertical scroll bar. The corresponding label of "item X (table-B)" (0303, 0309) will move to same row of record of "a".

"Display of references, (No. 2)": Record of "1B" displayed in "item X (table-B)" (0403) is specified by clicking. From pop-up by right-clicking, "Selection" (0404) is specified, and "1B" is made into selected status (0405). Interlocking with this, a record (of table-A 0401) whose value of item X (0402) is "1B" is made into selected status and will be displayed near to label of "1B" 0405, (for example, arranged to the side as shown in FIG. 4).

"Specification and change of a value of item X": When record "2a" (0504) is newly added to table-A (0501), the value of "item X" is set to default value that was specified beforehand. For example, "not decided" (0505, 0506). For changing this setup, the target (for example "2B") of "itemX (table-B)" is specified by left-clicking. From pop-up by right-clicking, "Setting" (0507) will be specified. Thus, labels of "Item X" (0502) and "Item X (table-B)" (0502) are set to "2B".

Even if a record of table-B is already specified to a record of table-A (0501), values of "Item X" (0502) and "Item X (table-B)" (0503) can be changed by the same way.

The following way will be used, if the original "item X" of table-A is not displayed, as like table-A (0301) of FIG. 3. First, a record of table-A is specified by clicking, as shown in "Display of references, (No. 1)". This record is the target of the following processes.

Label of the target in "item X (table-B)" is specified by right-clicking. From pop-up by right-clicking, "Setting" (0507) is specified. Thereby, value of "item X" of the record that was previously specified and value of "item X (table-B)" will be changed.

"Addition in item X": For adding a new record to "item X (table-B)" (0503), one record (for example, "2B" in FIG. 5) of "item X (table-B)" (0503) will be selected by left-clicking. Pop-up will be displayed by right-clicking. "Addition to upper position" (0508) or "addition to lower position" (0509) will be selected. At case of "addition to upper position", the new record is added between "2B" and "1B" (that is on it). At case of "addition to lower position", the new record is added between "2B" and "3B" (that is under it). Since it will be in the state of receiving an input of a label, inputs are character strings, numbers, etc.

Even at the middle of adding new record to table-A (0501), it is possible to add new record to "item X (table-B)" (0503) and specifies it. First, new record "2a" will be added to table-A (0501). At this time, values of "item X" (0502) and "item X (table-B)" (0503) are default and record of "2a" is in selected status.

Next, a record is added to "item X (table-B)", by clicking "addition to upper position" (0508) or "addition to lower position" (0509) on "item X (table-B)". After this, confirming selected state of record "2a", the added record is specified by left-clicking. And "setting" (0507) will be selected by right-clicking. Thus, the record newly added to "item X (table-B)" (0503) is specified to the record added to table-A (0501).

Of course, the following way is also possible. A record is added to "item X (table-B)" in advance. This record can be specified as value of "item X", when a new record is added to table-A.

"Deletion of record of item X": Original process of deleting a record of "item X (table-B)" (0503) is to delete the record after opening the table-B.

Addition to this, it is also possible to delete from labels displayed on "item X (table-B)" (0503) of table-A. When a label displayed on item X is selected, a record (of table-A) referring to the value can be confirmed, by the mechanism that was shown in "Display of references, (No. 2)". If there are no records of referring, "deletion" (0510) will be specified from pop-up by right-clicking, If there are records of referring, deletion will be given up. Or deletion will be tried again, after cancelling all the references. It is also possible to introduce a procedure of deleting a record of "item X (table-B)" (0503), and deleting records referring the record as the interlocking operation. However, it seems that there are few situations of using this.

Effect of the Invention

Not only "records of table-B that are referred to from table-A", but also "records of table-B that are not referred to from table-A" became possible to be displayed with table-A. When a record of table-A to observe is chosen, related (referenced to) label of "item X (table-B)" will be displayed in selected status. On the other hand, when a label of "item X (table-B)" to observe is chosen, related (referencing) label of table-A will be displayed in selected status. In this way, relation among both (Table-A and table-B) can be grasped clearly.

A record can be added to "item X (table-B)", at the middle of addition of new record to table-A. A record can be added to "item X (table-B)" at any time, while checking whole of table-A. Of course it is not restricted to the occasion of addition of a record to table-A.

Further, a record of "item X (table-B)" can also be deleted, while checking a relation with records of table-A.

As described above, by only operations focused to table-A, it became possible to grasp and to manage information of table-B that has been related. An operator can handle data, grasping whole perspective.

BRIEF DESCRIPTION OF THE DRAWINGS

FIG. 3 Table-B embedded as a column of table-A

FIG. 4 Record of table-A referring to a specific record of "item X (table-B)"

FIG. 9 Procedure of means (5) for highlighting a record of table-A referring to selected record of "item X (table-B)"

FIG. 10 Procedure of means (6) for setting reference from selected record of table-A to a record of "item X (table-B)"

FIG. 11 Procedure of means (7) for adding new record to "item X (table-B)"

DESCRIPTION OF NOTATIONS

0101 Table-A (Subordinate table)
0102 Table-B (Main table)
0103 Item X
0104 Reference
0201 Table-A
0202 Table-B
0203 Item X
0301 Table-A
0302 Item X−1
0303 Item X (table-B)
0304 Item X+1
0306 Table-A
0307 Item X−1
0308 Item X
0309 Item X (table-B)
0310 Item X+1
0401 Table-A
0402 Item X
0403 Item X (table-B)
0404 Selection
0405 1B (record displayed as "1B")
0406 (Left-hand portion of) records at selected status, which refer to "1B".
0407 (Right-hand portion of) records at selected status, which refer to "1B".
0501 Table-A
0502 Item X
0503 Item X (table-B)
0504 Record "2a"
0505 Default value: Not decided (Item X)
0506 Default value: Not decided ("Item X (table-B)")
0507 Setting
0508 Addition to upper position
0509 Addition to lower position
0510 Deletion
0601 Computer
0602 Database
0603 (1) Means for displaying table (table-A)
0604 (2) Means for displaying records of table-B that are reference destination of (a item of) table-A, as a column "item X (table-B)" of table-A.
0605 Means for highlighting (3) label of "item X (table-B)" referred to by selected record of table-A, and for displaying (4) both of them at the same line or neighborhood.
0606 (5) Means for highlighting a record of table-A referring to selected record of "item X (table-B)"
0607 (6) Means for setting reference from selected record of table-A to a record of "item X (table-B)"
0608 (7) Means for adding new record to "item X (table-B)"
0609 Device for display
0610 Means for accepting inputs
0611 Other programs
0612 Operator
0613 Printer
0701 Process for receiving a specification of item of table-A
0702 Process for creating an opening for one row on table-A
0703 Process for setting item name (of the column), for example "item X (table-B)"
0704 Process for displaying (on this column) a label list of records of a table that is reference destination.
0801 Process for receiving selection of a record of table-A
0802 Process for specifying a record of "item X (table-B)" which the record refers to
0803 Process for highlighting labels of specified record
0804 Process for displaying both on same line or the neighborhood
0901 Process for receiving a selection of record of item X (table-B)
0902 Process for specifying records of table-A which refers to the record
0903 Process for highlighting specified records
0904 Process for displaying both on same line or the neighborhood
1001 Process for receiving a specification of record (record of "a") of table-A
1002 Process for receiving a specification of record (record of "b") of item X (table-B)
1003 Process for setting reference to record "b" from record "a"
1101 Process for detecting that item X (table-B) is a processing object
1102 Process for detecting directions to create new record to table-B
1103 Process for creating a new record on table-B
1104 Process for receiving directions of value of each item of a new record and setting them

BEST MODE OF CARRYING OUT THE INVENTION

Figure 1:
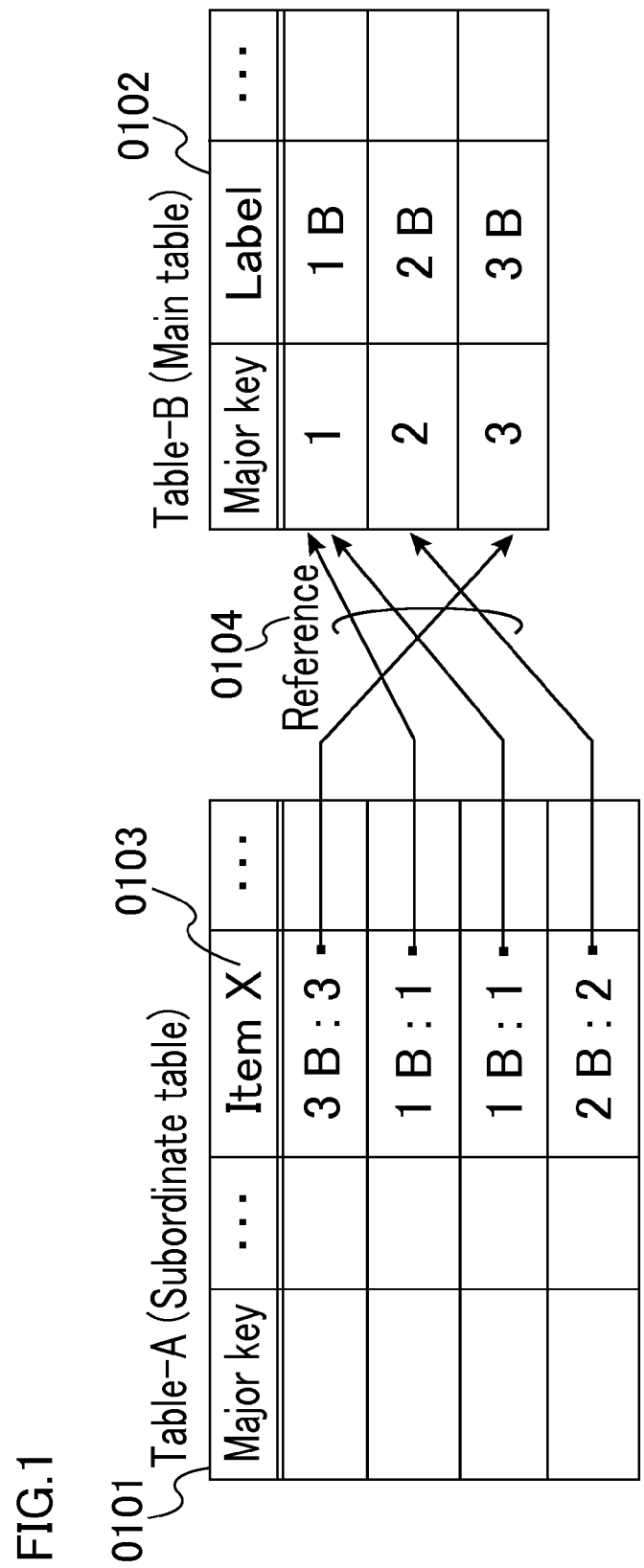
FIG. 1 Relations among tables
Figure 2:
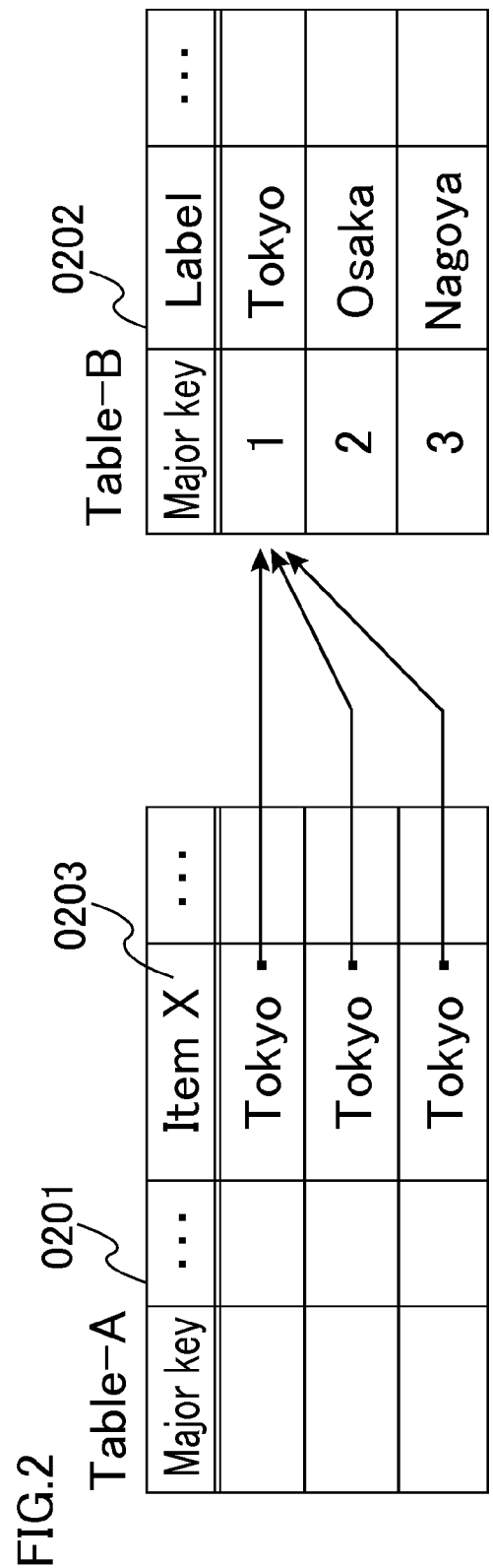
FIG. 2 Example at which only some labels are displayed
Figure 5:
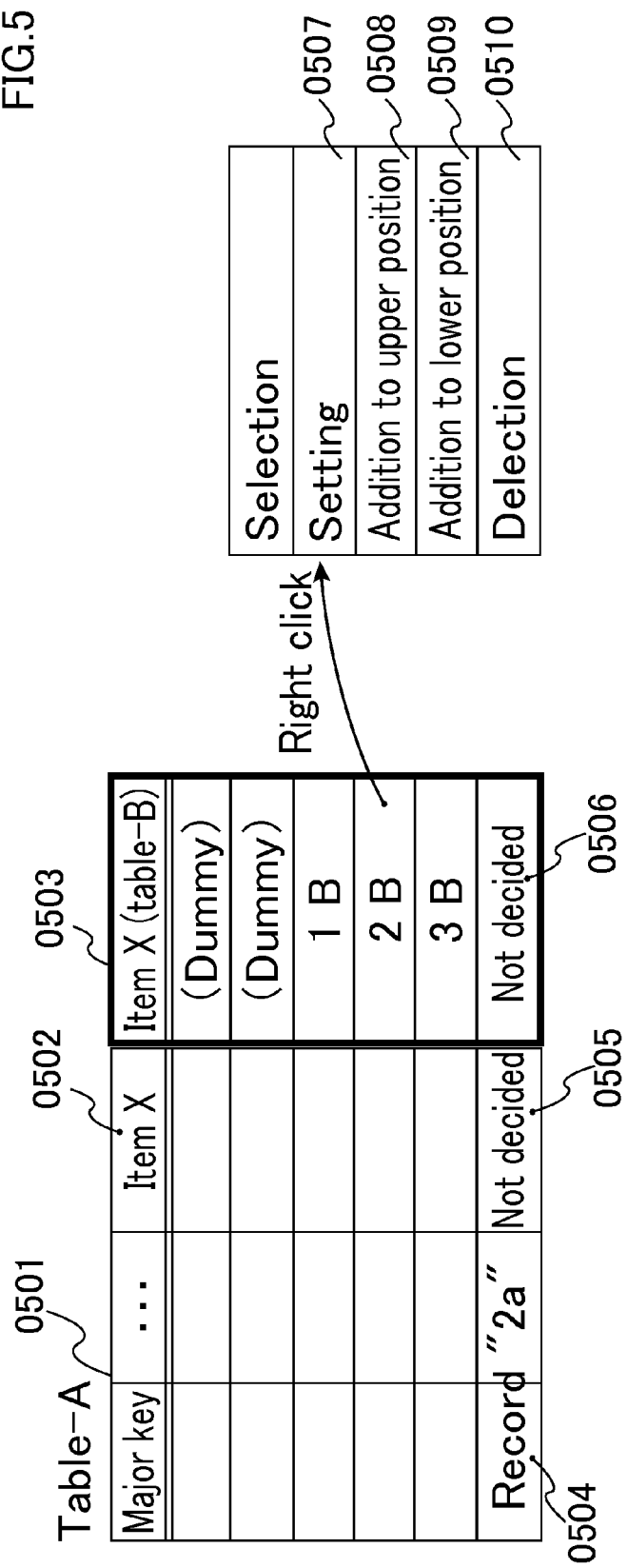
FIG. 5 Value setting to "item X", adding of record into "item X (table-B)", and deleting of record of "item X (table-B)"
Figure 6:
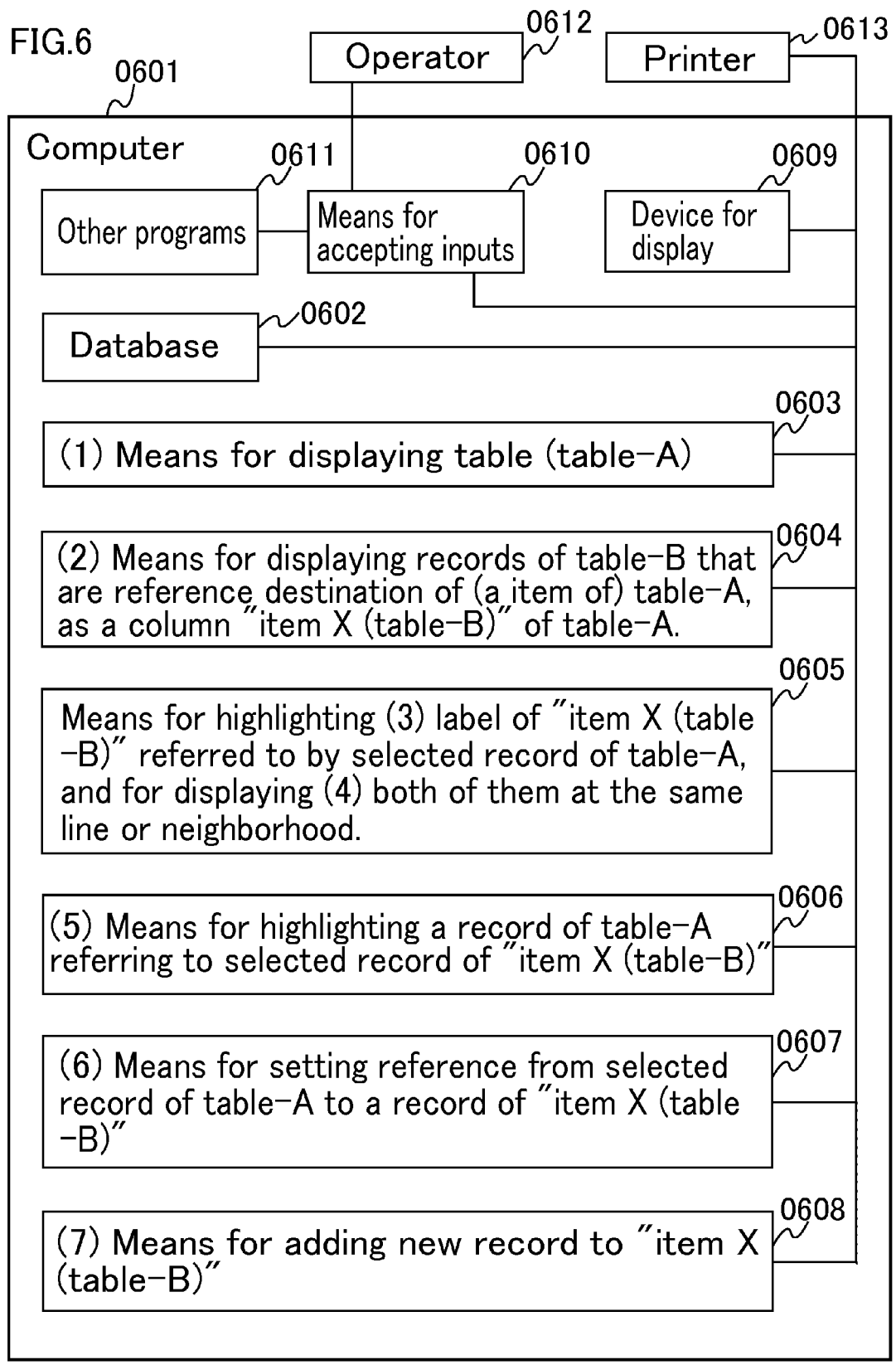
FIG. 6 Computer configured by the program of the present invention

Generally, computer is a connection (by bus) of arithmetic unit, main memory unit, secondary memory, input/output device, display. When computer executes a program of the present invention, computer (0601) functions as an aggregate of the following means. FIG. 6 shows this.

This computer interprets information of database (0602), shows it on the device for display (0609), interprets (by means for accepting inputs 0610) directions from operator (0612) or from other programs (0611), edits contents of the database, and prints to printer (0613). This computer that read a program of the present invention displays a table of a database. Thus, "(1) means for displaying table (table-A)" (0603) is indispensable for this computer.

Figure 7:
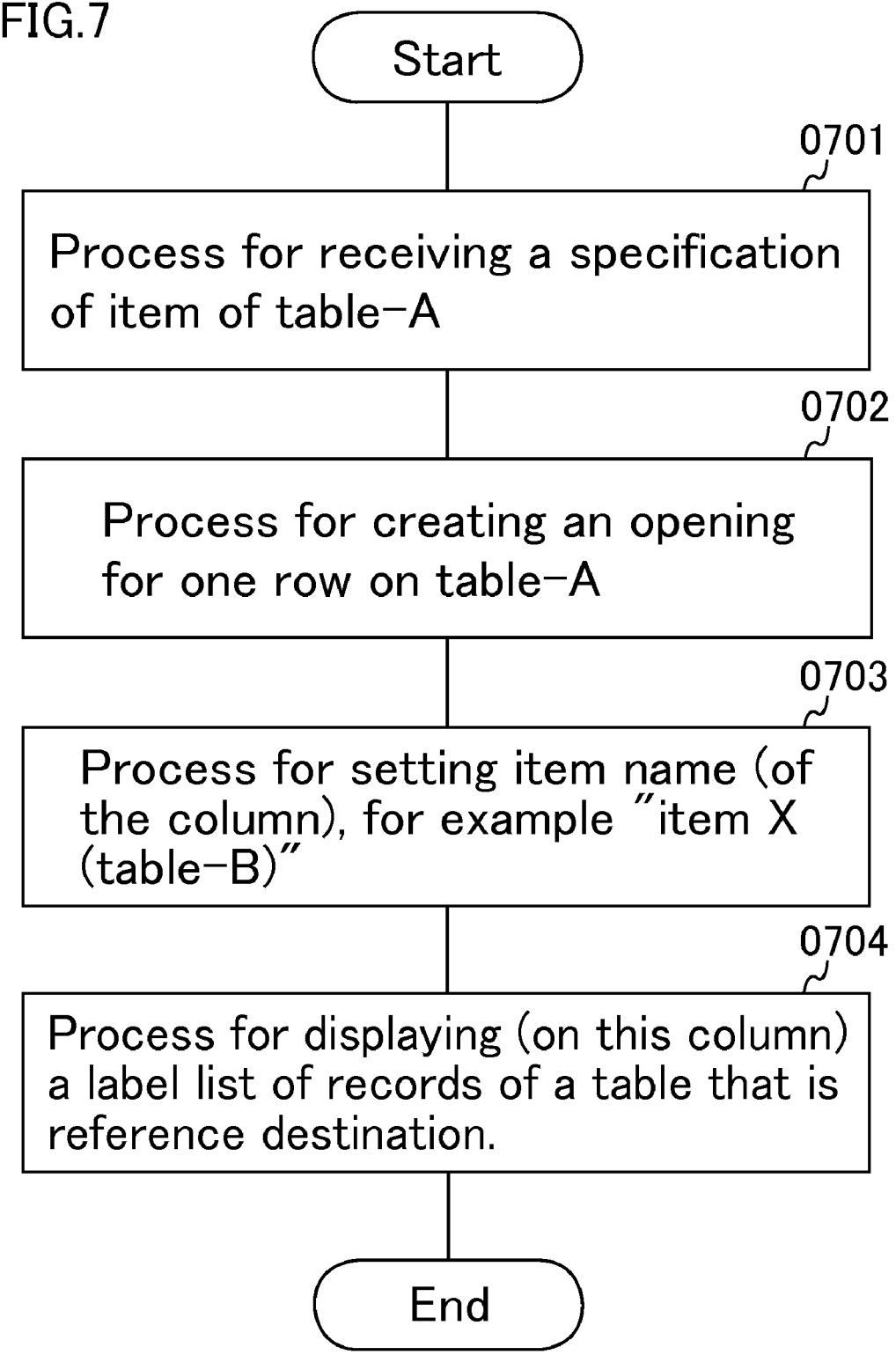
FIG. 7 Procedure of means (2) for displaying records of table-B (that are reference destination of table-A) as a column of "item X (table-B)" of table-A.

FIG. 7 shows procedure of "(2) Means for displaying records of table-B that are reference destination of (an item of) table-A, as a column item X (table-B) of table-A" (0604). It receives a specification of item of table-A (0701), creates an opening for one row on table-A (0702), sets item name (of the column), for example "item X (table-B)" (0703), and displays (on this column) a label list of records of a table that is reference destination (0704).

Figure 8:
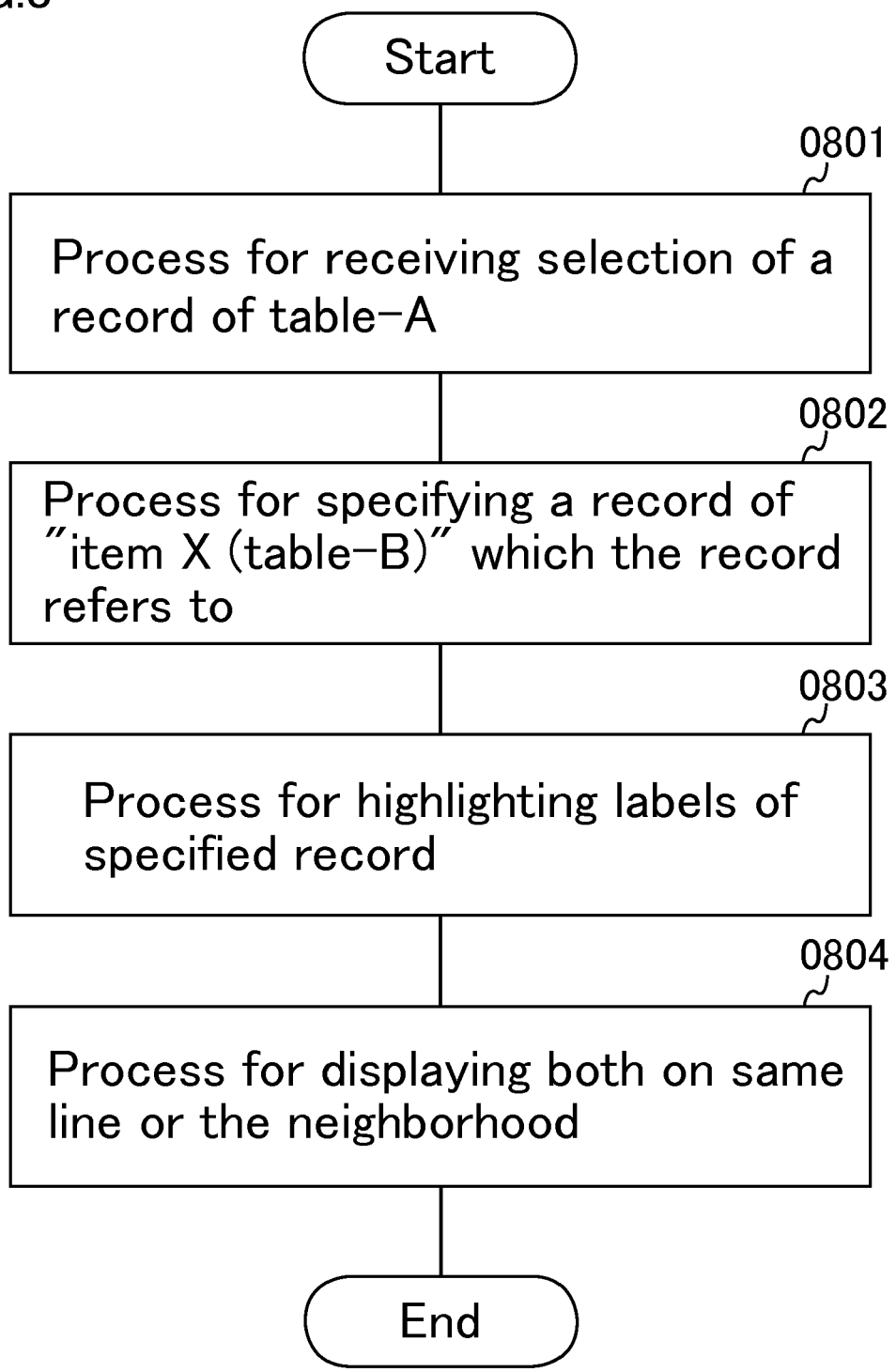
FIG. 8 Procedure of means for highlighting (3) label of "item X (table-B)" referred to by selected record of table-A, and for displaying (4) both of them at the same line or neighborhood.

FIG. 8 shows procedure of highlighting (3) label of "item X (table-B)" referred to by selected record of table-A, and procedure of displaying (4) both of them at the same line or neighborhood. It receives selection of a record of table-A (0801), specifies a record of "item X (table-B)" which the record refers to (0802), highlights labels of specified record (0803), and displays both on same line or the neighborhood (0804).

FIG. 9 shows procedure of means (5) for highlighting a record of table-A referring to selected record of "item X (table-B)". It receives a selection of record of "item X (table-B)" (0901), specifies records of table-A which refers to the record (0902), highlights specified records (0903), and displays both on same line or the neighborhood (0904).

FIG. 10 shows procedure of means (6) for setting reference from selected record of table-A to a record of "item X (table-B)". It receives a specification of record (record of "a") of table-A (1001), receives a specification of record (record of "b") of item X (table-B) (1002), and sets reference to record "b" from record "a" (1003).

FIG. 11 shows procedure of means (7) for adding new record to "item X (table-B)". It detects that item X (table-B) is a processing object (1101), detects directions to create new record to table-B (1102), creates a new record on table-B (1103), receives directions of value of each item of a new record and sets them (1104).

Example 1

Example 1 will be table-A (0301) of the upper part of FIG. 3. Here, displayed side by side are records of table-B (which is destination of a reference), at the position of item X (at which the reference to table-B was set), or at top or tail or any position of table-A (0301). The original display of item X is hidden.

Example 2

Example 2 will be table-A (0306) of the lower part of FIG. 3. Here, item X (at which a reference to table-B was set) remains. Immediately after (or before) this item or at top, tail or any position of the table, item X (table-B) will be created. On this item, placed side by side are records of table-B (which is destination of a reference)

Example 3

In example 3, assuming of existence of an item (to which a relation is set), for example "item X", column of "item X (table-B)" is always displayed, in conjunction with opening of table-A. Example 3, and below-mentioned Example 4 and Example 5 can be carried out in combination with the Example 1 or Example 2.

Example 4

For an item (to which a relation is set) of table-A, for example "item X", operator indicates (beforehand) whether to display "item X (table-B)" or not, in example 4. By checking the information when opening of table-A, decision of displaying (or not displaying) "item X (table-B)" will be made.

Example 5

Example 5 is the following. First, table-A is opened in usual state. For an item (to which a relation is set), for example "item X", a program will display "item X (table-B)" by responding to operator's directions (to display it). The program will close "item X (table-B)", by responding to operator's directions (to close it). After this, the original "item X" will be displayed. Example 4 and Example 5 can be combined and carried out. That is, operator's directions in Example 5 are recorded and will be used in Example 4.

INDUSTRIAL APPLICABILITY

On a column of table displays all the information of table of a reference destination. And reference relations of both records are displayed exactly. Even at the middle of adding a record, it became possible to add a record that is referred to by the record. Through checking reference relations, deletion of a record can be performed. Since these were realized, an operator can handle data of table, grasping whole perspective.

I claim:

1. A computer operable method of displaying a relational database, comprising,
    (1) a process of displaying a table (hereinafter "displayed-table") of said database, in a table style,
    (2) a process of displaying a list of a record of a table (hereinafter "inserted-table") as a column (hereinafter "inserted-column") inserted to said displayed-table, by ignoring a relation to a record of said displayed-table.

2. A computer operable method of displaying a relational database, comprising,
    (1) a process of displaying a table (hereinafter "displayed-table") of said database, in a table style,
    (2) a process of displaying a list of a record of a table (hereinafter "inserted-table") as a column (hereinafter "inserted-column") inserted to said displayed-table, by ignoring a rule that a record (hereinafter "referenced-record") of the inserted-table is placed at the same line of a record (hereinafter "referencing-record") of said displayed-table, here said referencing-record refers said referenced-record.

3. A computer operable method of displaying a relational database, comprising,
    (1) a process of displaying a table (hereinafter "displayed-table") of said database, in a table style,
    (2) a process of displaying a list of a record of a table (hereinafter "inserted-table") as a column (hereinafter "inserted-column") inserted to said displayed-table, here, a record of said inserted-table is shown as at most one row of said inserted-column, even if said record is referred by plural records of said displayed-table.

4. The computer operable method according to claim 1, claim 2 or claim 3, further comprising:
    (3) a process including:
        a step of identifying a selected record (hereinafter "selected-record") of said displayed-table,
        a step of finding a record (hereinafter "referred-record") of inserted-table that is referred from said selected-record, and
        a step to emphasize said referred-record, or to place said selected-record and said referred-record on a same line or neighborhood.

5. The computer operable method according to claim 1, claim 2 or claim 3, further comprising:
    (3) a process including:
        a step of identifying a record (hereinafter "selected-record") of said inserted-table,
        a step of finding a record (hereinafter "referring-record") of displayed-table that is referring to said selected-record, and
        a step to emphasize said referring-record, or to place said selected-record and referring-record on a same line or neighborhood.

6. A computer-readable non-transitory medium containing a program for displaying a relational database, performing processes comprising:
    (1) a process of displaying a table (hereinafter "displayed-table") of said database, in a table style,
    (2) a process of displaying a list of records of a table (hereinafter "inserted-table") as a column (hereinafter "inserted-column") inserted to said displayed-table, by ignoring relations to records of said displayed-table.

7. A computer-readable non-transitory medium containing a program for displaying a relational database, performing processes comprising:
- (1) a process of displaying a table (hereinafter "displayed-table") of said database, in a table style,
- (2) a process of displaying a list of records of a table (hereinafter "inserted-table") as a column (hereinafter "inserted-column") inserted to said displayed-table, by ignoring a rule that a record (hereinafter "referenced-record") of the inserted-table is placed at the same line of a record (hereinafter "referencing-record") of the displayed-table, here said referencing-record refers said referenced-record.

8. A computer-readable non-transitory medium containing a program for displaying a relational database, performing processes comprising:
- (1) a process of displaying a table (hereinafter "displayed-table") of said database, in a table style,
- (2) a process of displaying a list of records of a table (hereinafter "inserted-table") as a column (hereinafter "inserted-column") inserted to said displayed-table, here, a record of said inserted-table is shown as at most one row of said inserted-column, even if said record is referred by plural records of said displayed-table.

9. The computer-readable non-transitory medium performing processes, according to claim 6, claim 7 or claim 8, further comprising:
- (3) a process including:
  - a step of identifying a selected record (hereinafter "selected-record") of said displayed-table,
  - a step of finding a record (hereinafter "referred-record") of inserted-table that is referred from said selected-record, and
  - a step to emphasize said referred-record, or to place said selected-record and said referred-record on a same line or neighborhood.

10. The computer-readable non-transitory medium performing processes, according to claim 6, claim 7 or claim 8, further comprising:
- (3) a process including:
  - a step of identifying a record (hereinafter "selected-record") of said inserted-table,
  - a step of finding a record (hereinafter "referring-record") of displayed-table that is referring to said selected-record, and
  - a step to emphasize said referring-record, or to place said selected-record and referring-record on a same line or neighborhood.

* * * * *